(12) United States Patent
Van Horlick

(10) Patent No.: US 10,021,828 B2
(45) Date of Patent: Jul. 17, 2018

(54) AUTOMATED PLANTER FOR PLANTING SEEDLINGS IN OBSTACLE-STREWN AND/OR UNEVEN TERRAIN

(71) Applicant: Tim C. Van Horlick Forestry Inc., Carstairs (CA)

(72) Inventor: Timothy Charles Van Horlick, Carstairs (CA)

(73) Assignee: Tim C. Van Horlick Forestry Inc. (CA)

( * ) Notice: Subject to any disclaimer, the term of this patent is extended or adjusted under 35 U.S.C. 154(b) by 45 days.

(21) Appl. No.: 15/187,693

(22) Filed: Jun. 20, 2016

(65) Prior Publication Data

US 2017/0359950 A1    Dec. 21, 2017

(51) Int. Cl.
*A01C 5/04* (2006.01)
*A01C 11/02* (2006.01)

(52) U.S. Cl.
CPC .............. *A01C 11/02* (2013.01); *A01C 5/04* (2013.01)

(58) Field of Classification Search
CPC .. A01C 5/04; A01C 5/00; A01C 11/02; A01C 11/00
See application file for complete search history.

(56) References Cited

U.S. PATENT DOCUMENTS

| | | |
|---|---|---|
| 3,590,948 A | 7/1971 | Milner, Jr. |
| 3,818,957 A | 6/1974 | Schoonover |
| 3,870,158 A | 3/1975 | Burley |
| 4,044,952 A | 8/1977 | Williams |
| 4,055,255 A | 10/1977 | Vasquez |
| 4,106,669 A | 8/1978 | Longman |
| 4,169,511 A | 10/1979 | Brown |
| 4,207,950 A | 6/1980 | Kinzenbaw |
| 4,299,292 A | 11/1981 | Hughes |
| 4,326,571 A | 4/1982 | Crawford |
| 4,332,299 A | 6/1982 | Parks et al. |

(Continued)

FOREIGN PATENT DOCUMENTS

| | | |
|---|---|---|
| CA | 1162824 | 2/1984 |
| CA | 2343911 | 1/2002 |

(Continued)

OTHER PUBLICATIONS

Tim C. Van Horlick Forestry Inc., VH Mulcher—printouts from the website "www.vhmulcher.com" and enclosed CDRom of video.

*Primary Examiner* — Christopher J Novosad
(74) *Attorney, Agent, or Firm* — D. Doak Horne

(57) ABSTRACT

An automated planter device for planting seedlings in an obstacle-strewn and/or uneven terrain. A laterally extendable boom is located at the end of a vertically-moveable arm, which arm may also be swung from side to side. The boom has a plurality of spaced-apart seedling injectors thereon for planting seedlings. Advantageously, due to variably adjustable positioning of the seedling injectors on the boom, obstacles encountered such as tree stumps or medium sized rocks capable of being traversed but which otherwise create an obstacle to a typical seedling planter, may be avoided. The seedling injectors are each coupled via vacuum hoses to a bin mounted on the planter, which vacuum hoses supply seedlings from the bin to the injectors. A powered gantry at the rear of the planter unloads the bin from the planter when empty, and engages and lifts a re-stocked bin containing additional seedlings onto the rear of the device.

14 Claims, 12 Drawing Sheets

(56) References Cited

U.S. PATENT DOCUMENTS

| | | | |
|---|---|---|---|
| 4,351,253 A | 9/1982 | Dahlquist | |
| 4,413,661 A | 11/1983 | Marchildon | |
| 4,505,096 A | 3/1985 | Brown | |
| 4,694,577 A | 9/1987 | van der Merwe et al. | |
| 4,860,454 A | 8/1989 | van der Merwe et al. | |
| 4,862,969 A | 9/1989 | Jobst et al. | |
| 5,042,589 A | 8/1991 | Hundeby et al. | |
| 5,074,996 A | 12/1991 | Galanty | |
| 5,092,422 A | 3/1992 | Hood, Jr. et al. | |
| 5,222,563 A | 6/1993 | Van Horlick | |
| 5,280,685 A | 1/1994 | Turner | |
| 5,584,356 A | 12/1996 | Goodrich | |
| 5,788,300 A | 8/1998 | Dickison | |
| 5,913,915 A | 6/1999 | McQuinn | |
| 6,014,835 A | 1/2000 | Pivonka | |
| 6,062,793 A | 5/2000 | Isley | |
| 6,122,581 A | 9/2000 | McQuinn | |
| 6,158,362 A | 12/2000 | Culley | |
| 6,230,091 B1 | 5/2001 | McQuinn | |
| 6,341,568 B1 | 1/2002 | Culley | |
| 6,343,659 B1 | 2/2002 | Sexsmith | |
| 6,343,663 B1 | 2/2002 | Hill et al. | |
| 2002/0157730 A1 | 10/2002 | Nault | |
| 2006/0156590 A1 | 7/2006 | Capolupo | |
| 2008/0016725 A1 | 1/2008 | Boehm | |
| 2008/0276846 A1 | 11/2008 | Friggstad | |

FOREIGN PATENT DOCUMENTS

| | | |
|---|---|---|
| EP | 0501585 | 9/1992 |
| FR | 2598287 | 11/1987 |
| FR | 2603453 | 3/1988 |
| FR | 2692101 | 12/1993 |
| JP | 20030730076 | 3/2003 |
| RU | 2223620 | 2/2004 |
| RU | 2004128715 | 10/2006 |
| UA | 77567 | 12/2006 |
| WO | WO9638032 | 12/1996 |
| WO | WO200120971 | 3/2001 |

AUTOMATED PLANTER FOR PLANTING SEEDLINGS IN OBSTACLE-STREWN AND/OR UNEVEN TERRAIN

FIELD OF THE INVENTION

The present invention relates to devices for planting seedlings. More particularly, the present invention relates to an automated seedling planter for planting seedlings in obstacle-strewn and/or uneven terrain.

BACKGROUND OF THE INVENTION

This background and documents mentioned below are provided for the purpose of making known information believed by the applicant to be of possible relevance to the present invention, and in particular allowing the reader to understand advantages of the invention over devices and methods known to the inventor, but not necessarily public. No admission is necessarily intended, nor should be construed as admitting, that any of the following documents or methods known to the inventor constitute legally citable prior art against the present invention.

CA 2,343,911 entitled "Tree Planting Mound Preparation Apparatus" teaches, in FIG. 7 thereof, an excavator 26 modified to have a disc blade 7 mounded on a distal end of the excavator moveable arm, replacing the excavator bucket normally there situated. CA '911 does not teach any means or device for injecting seedlings into soil, nor any manner or apparatus to provide seedlings at the distal end of the moveable arm 18.

U.S. Pat. No. 6,343,663 entitled "Horizontal Boring Apparatus" teaches, in FIG. 1 thereof, an crawler excavator 10 having a hydraulically powered rotary drive mechanism 30 attached to a distal end of the excavator moveable articulated arm 18, replacing the excavator bucket normally there situated, for powering a helical boring tool. U.S. Pat. No. '663 does not teach any means or device for injecting seedlings into soil, nor any manner or apparatus to provide seedlings at the distal end of the moveable arm 18.

U.S. Pat. No. 5,222,563 entitled "Mulching Apparatus" to the within inventor, teaches a powered excavator-type vehicle 10 having a manipulable boom 12, to which mulching apparatus 14 is removably coupled. Hydraulic connections are provided between boom 12 and mulching apparatus 14 to power hydraulic motor 16. A mulching head 24 at the distal end of the manipulable boom 12, has a rotatable base plate 37, having protruding cutting teeth 42, 44. U.S. Pat. No. '563 does not teach any means or device for injecting seedlings into soil, nor any manner or apparatus to provide seedlings at the distal end of the moveable arm 18.

U.S. Pat. No. 3,818,957 entitled "Land Clearing and Tree Planting Site Preparation Apparatus" teaches a tracked vehicle such as a bulldozer or skid-steer device, having a boom means for mounting a rotating cutting and tree planting site preparation wheel. Hydraulic motor means are provided for rotating shafts powering the cutting/side preparation wheel.

U.S. Pat. No. 4,413,661 entitled "Boom Mount" teaches a mobile tree processor having a boom member reciprocally mounted thereon, wherein the boom member can be raised and lowered while it remains horizontal and parallel to the ground. U.S. Pat. No. '661 does not teach any means or device for injecting seedlings into soil, nor any manner or apparatus to provide seedlings at the distal end of the boom 30.

U.S. Pat. No. 4,351,253 entitled "Tree Planter and Trailer" teaches a truck having a digger mounted to an hydraulically mounted boom pivotally mounted at one end to the frame of the truck, and a trailer which can be towed by the truck.

US 2006/0156590 entitled "Tree Root Pruning Apparatus and Method of Use" teaches a tracked vehicle with an articulated machine arm, with root pruning vibratory apparatus affixed to the distal end of such machine arm.

U.S. Pat. No. 6,343,659 entitled "Mini Shrub Spader" teaches a hydraulically actuated U-blade, which is attached to a frame which has at its opposite end a three-point hitch arrangement for attachment to a 3-point hitch on the back of a tractor.

Notably with regard to the above, none of such prior art documents not teach any means or device for injecting seedlings into soil, nor any manner or apparatus to provide seedlings at the distal end of the boom 30 to allow for successive injection of a plurality of seedlings simultaneously into soil.

Tracts of forested or burned land having residual tree stumps and/or tree snags, or alternatively rocky land, all traditionally require significant site preparation using mechanized equipment such as bulldozers, rock pickers and the like, before conventional seedling planting devices can operate to plant trees on such tracts of land.

While mechanized site preparation in the above manner is not needed when large labour forces of humans, who may manually navigate and avoid such obstacles when planting small trees and seedlings, such alternative necessarily has high cost drawbacks.

Accordingly, a real need exists in the silviculture industry for automated seedling and small tree planting apparatus which can not only successively inject a plurality of seedlings or small trees simultaneously into soil, and do so continuously in a relatively rapid and efficient manner using few human operators, but which may also be able to do so over obstacle-strewn landscape.

SUMMARY OF THE INVENTION

To meet the aforesaid need in the silviculture industry, it is an object of the invention to provide an automated seedling planter machine which efficiently automates the act of planting and optionally cultivating seedlings on obstacle-strewn terrain.

It is a further object of the present invention to provide an automated seedling planter which provides improvement in speed in planting and associated costs over the heretofore required common practice of using manual labor used in planting sites having uneven terrain or terrain having obstacles therein such as tree stumps which sites have heretofore required manual labor for seedling planting.

It is a still further object of certain embodiments of the present invention to provide a planting apparatus which can be comparatively easily fabricated by making modification to existing mass-produced equipment, such as an earth excavator.

A spacing between seedlings being planted at a particular site varies depending on climactic conditions, soil quality, and type of seedling being planted, and also due to the presence of haphazard obstacles which may be strewn over a terrain and which otherwise precludes consistent and uniform planting of seedlings by an automated planter, it is a still-further object to provide a seedling planting apparatus whereby seedling injectors thereon may be quickly repositioned so as to thereby adjust the spacing between seedlings when planted.

Accordingly, in a first broad embodiment the present invention provides an automated seedling planter for planting seedlings in ground, comprising:

- a powered vehicle configured to traverse said ground, having a cab thereon for an operator;
- an elongate, powered, moveable arm, a proximal end of which is secured to said vehicle and a distal end of which is extendable outwardly from said vehicle;
- an elongate boom member, mounted at said distal end of said moveable arm at least portions of which are disposed parallel to said ground;
- a plurality of seedling injectors for planting seedlings in said ground, mounted in spaced relation along a length of said elongate boom member, said plurality of seedling injectors comprising at least a pair of seedling injectors mounted on mutually opposite ends of said boom member;
- said seedling injectors each comprising soil-engaging members for piercing and/or tilling the ground when injecting said seedlings in said ground;
- a bin, configured to contain said seedlings; and
- a plurality of flexible hoses extending from said bin to respectively each of said seedling injectors, for successively supplying individual of said seedlings from said bin to each of said seedling injectors for planting in said ground.

In an alternative embodiment the seedling planter of the present invention is fabricated by modifying a commercially available excavator. Such advantageously provides a tracked vehicle readily adapted to the further modifications set out herein.

Accordingly, in such further aspect of the invention, such planter comprises:

- a modified earth excavator having tracks for propelling said modified earth excavator over said ground, having:
  - (i) a cab thereon for an operator to control said seedling planter;
  - (ii) an elongate, powered moveable arm, a distal end of which is vertically-positionable and extendable outwardly from said modified earth excavator;
  - (iii) an elongate boom member mounted at said distal end of said moveable arm and replacing a normally-situated excavator bucket at said distal end of said moveable arm, said elongate boom member extending parallel to said ground;
  - (iv) a plurality of seedling injectors mounted along a length of said elongate boom member, said plurality of seedling injectors comprising at least a pair of seedling injectors mounted on mutually opposite ends of said boom member;
  - (v) said seedling injectors each containing soil-engaging members for piercing and/or tilling the ground when injecting seedlings in said ground;
  - (vi) a bin, configured to contain said seedlings; and
  - (vii) a plurality of flexible hoses extending from said bin to respectively each of said seedling injectors, for supplying individual seedlings from said bin to each of said seedling injectors.

In both embodiments, the flexible hoses are preferably are vacuum hoses. Supply of seedlings to each of said seedling injectors is achieved by the seedling injectors withdrawing air from an associated of said hoses extending to said bin.

In both embodiments, each of the seedling injectors may further be provided with soil tillage appendages protruding from a ventral position thereon, such soil tillage appendages engaging the ground during injection of a seedling in the ground, and adapted to be reciprocated in a back and forth manner at a time of injection of a seedling in said ground by a respective seedling injector.

Advantageously, by the automated seedling planter of the present invention having a boom member mounted on a movable arm numerous advantages useful for efficient and automated planting can be realized.

By way of few non-limiting examples, as a first example, by having the boom member effectively replace the excavator bucket of a commercially-available excavator, the movable arm and boom member may be swung if desired from a normal position directly in front of the seedling planter to an offset position to the side of the planter. Specifically, by swinging the moveable arm and boom member to the side of the automated planter. If the boom rotation feature is further incorporated, the boom member when swung to the side may still, if desired, be maintained perpendicular to the direction of travel. In either scenario, by having the boom member and seedling injectors situated to the side of the vehicle, such capability is particularly useful where the spacing of seedling injectors along the length of the boom members crowded and planting seedlings using the seedling injectors in front of the seedling planter would result in some of the planted seedlings being crushed by the tracks when the planter passes forwardly and over them.

As a second example, having seedling injectors mounted on a boom member parallel to the ground advantageously allows for adjustable positioning of at least the seedling injectors on mutually opposite ends of the boom member, which is extremely useful for obstacle avoidance.

As a third benefit of the design, which provides for mounting of the seedling injectors on the boom member, the ends for such boom member may be made pivotable, wherein one or both of the ends may be temporarily raised to allow for obstacle avoidance and passage of such boom member and seedling planter past such obstacle, such as a remaining tree in an otherwise burned forest area that is being re-planted after a fire, or to avoid a stump in a previously logged area that is now being re-seeded.

Pivotable ends of the boom member also allow for folding over of the pivotable ends, so as to reduce the width of the planter apparatus to allow transportation of such planter apparatus on roadways having a lesser width and thus be able to meet width limitations for travel over such roadways.

In a preferred embodiment of the seedling planter, ends of the boom member are extended and retracted by powered means, such as by a hydraulic cylinder supplied by pressurized hydraulic fluid from the vehicle. A pair of hydraulic cylinders, for example, may be mounted proximate mutually opposite respective ends of the boom member, and when actuated extend or retract such mutually opposite ends. The mutually opposite ends typically have mounted thereon a seedling injector, and in such manner the position of each seedling injector at such mutually opposite ends of the boom member may be individually altered. This feature is particularly advantageous if an obstacle were to be encountered on the terrain being seeded, and relocation of one seedling injector on the boom member is needed to temporarily avoid the obstacle to allow further progression of the automated seeder, or to allow a non-uniform positioning of a seedling which is unable to be located in a uniform position due to an obstacle such as tree stump, rock, or the like.

In a refinement, the boom member may be provided with powered separator means thereon for altering a distance separating two or more seedling injectors on said boom member from each other. The powered separator means is actuated and controlled by the operator from the cab of the seedling planter. The powered separator means for varying or altering the separation of the plurality of seedling injectors between each other may take the form of hydraulic cylinders or other means of motive power such as electric motors driving gearing which relocates the seedling injectors along the boom member. Such feature advantageously allows the avoidance of interference of a seedling injector on the boom member with a local obstacle, such as a tree stump, and may also allow variably adjust the separation distance of seedling injectors on the boom member to quickly allow more dense or less dense planting of seedlings.

In an embodiment of the invention where the automated seedling planter is constructed by modifying a commercially-available earth excavator and the excavator bucket replaced by the boom member of the present invention, the powered means for extending and retracting ends of said boom member is coupled to and controlled by hydraulic pressure lines which otherwise would have been used by said operator to control said otherwise normally-situated excavator bucket on said moveable arm. In such manner the automated seeding apparatus may be relatively easily manufactured from modifications made to a commercially—available vehicle with only retrofitting of a commercially—available excavator being required.

Depending on the types of seedlings, the quality and fertility of the soil in which the seedlings are being planted, and local meteorological conditions such as the amount of annual rainfall received, the spacing between planted seedlings may wish to be adjusted, prior to commencing seeding.

While altering the distance separating the seedling injectors along the boom member may be done using powered means, alternatively, the separation of the seedling injectors on the boom member may be manually adjusted, prior to the commencement of seedling planting, so as to thereby beforehand adjust the spacing of seedlings being planted. In such an embodiment each seedling injector mounted on said boom member is further provided with a position adjustment mechanism to allow altering or varying spacing of seedling injectors along said boom member. Such position adjustment means may be a powered means, such as a hydraulic cylinder, or may be a manual relocation means, such as a series of slidable positions with a manually operated pin which may be inserted to thereby lock each seedling injector at a desired slidable position along the boom member. Where a manual relocation capability is provided, an operator may, prior to commencement of planting, manually adjust the position of the seedling injectors along the boom member. Such adjustment mechanism also allows more seedling injectors to be added on the boom member and the spacing of remaining seedling injectors already mounted on the boom member to be slidably adjusted, so as to maintain uniform spaced apart distance between each.

In a further refinement, the boom member is comprised of two half-members extending perpendicularly outwardly from respective mutually opposite sides of said distal end of said moveable arm. Each of the half-members are provided with a pivotable wrist member pivotably mounted at an outboard end of each of said half-members. The pivotable wrist members are each respectively coupled to a respective hydraulic cylinder to allow powered upward pivoting of each wrist member when the respective hydraulic cylinder is actuated by said operator. In such manner, with selective upward pivoting of the wrist members, low obstacles such as stumps can be passed over by the seeder planter. Also, upward pivoting of both wrist members effectively decreases the width of the boom member, useful for transporting the automated seedling planter over roadways of lesser width.

In a further refinement, a boom-rotating means may be provided at the distal end of said moveable arm, for rotating said boom member within a plane parallel to said ground. Typically, the boom-rotating means will only allow a maximum rotation in one direction of a 90° arc, due to otherwise causing twisting or parting of flexible tubing lines used in conveying seedlings from the bin to each of the seedling injectors (see further discussion of flexible tubing lines, below). Preferably, the boom-rotating means is powered to allow the planter-operator to rotate the boom member remotely from the cab of the seedling planter.

In an embodiment of the invention where the automated seedling planter is constructed by modifying a commercially-available earth excavator and the excavator bucket replaced by the boom member of the present invention, the boom-rotating means is may be powered by and physically coupled to hydraulic pressure lines which otherwise would have been used by said operator to control said normally-situated excavator bucket on said moveable arm.

In a further aspect of the present invention, the design lends itself to being able to load and unload a bin containing seedlings, which bin is transported by the seedling planter of the present invention.

Accordingly, in a further refinement of the present invention, the seedling planter further comprises a powered gantry for lifting the bin onto the seedling planter, and for demounting said bin from the vehicle when supply of seedlings therein is exhausted. The powered gantry may further possess bin-engaging apparatus for releasably engaging said bin to allow said powered gantry to lift said bin onto said vehicle and to demount said bin from said vehicle.

Preferably, the moveable arm which is pivotably mounted on the seedling planter, may further be pivoted from side to side of the vehicle when desired by said operator.

Where used herein, the term "excavator" means and includes include a tracked vehicle or rubber-tyred loader, unless followed with a specific reference to the excavator being a tracked excavator.

In addition, where the term "seedling" is used, such may include a young tree and/or a germinated seed, and further includes and is not limited to tree cuttings (eg. twigs without roots), seedlings in earth plugs with or without biodegradable wrappings, and seeds or embryos.

The above summary of the invention does not necessarily describe all features of the invention.

For a complete description of the invention, reference is to further be had to the drawings and the detailed description of some preferred embodiments, read together with the claims.

BRIEF DESCRIPTION OF THE DRAWINGS

Further advantages and other embodiments of the invention will now appear from the above along with the following detailed description of the various particular embodiments of the invention taken together with the accompanying drawings, each of which are intended to be non-limiting, in which.

DETAILED DESCRIPTION OF SOME PREFERRED EMBODIMENTS

Figure 1:
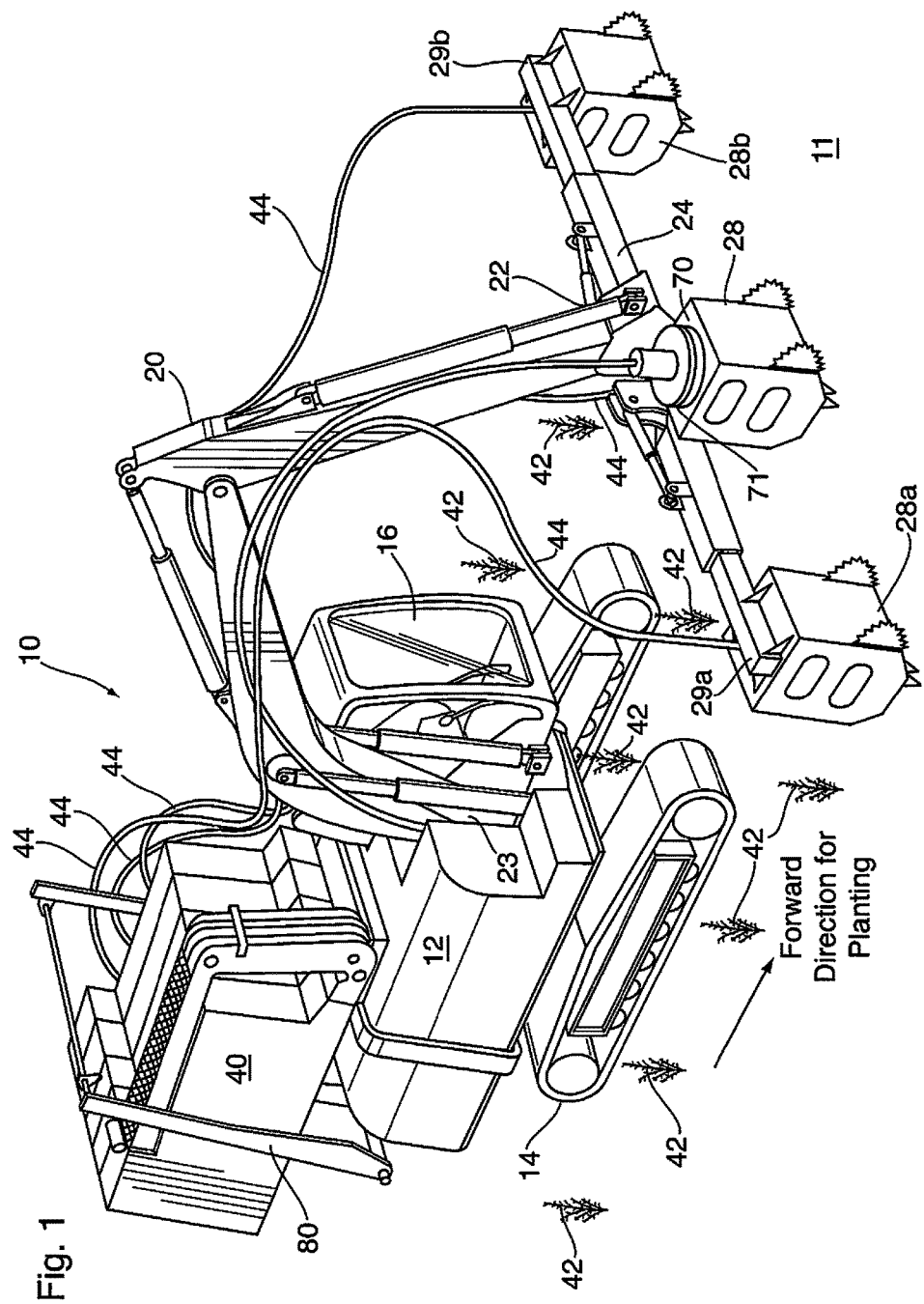
FIG. 1 is depicts a front perspective view of the automated seedling planter of the present invention, positioned to plant seedlings in the ground, and which employs a gantry system for mounting a bin containing seedlings on the rear of the automated seedling planter.

In the following description, similar and functionally equivalent components in the drawings are identified with corresponding same reference numerals.

Reference to an element in the singular, such as by use of the article "a" or "an" is not intended to mean "one and only one" unless specifically so stated, but rather "one or more".

Figure 2:
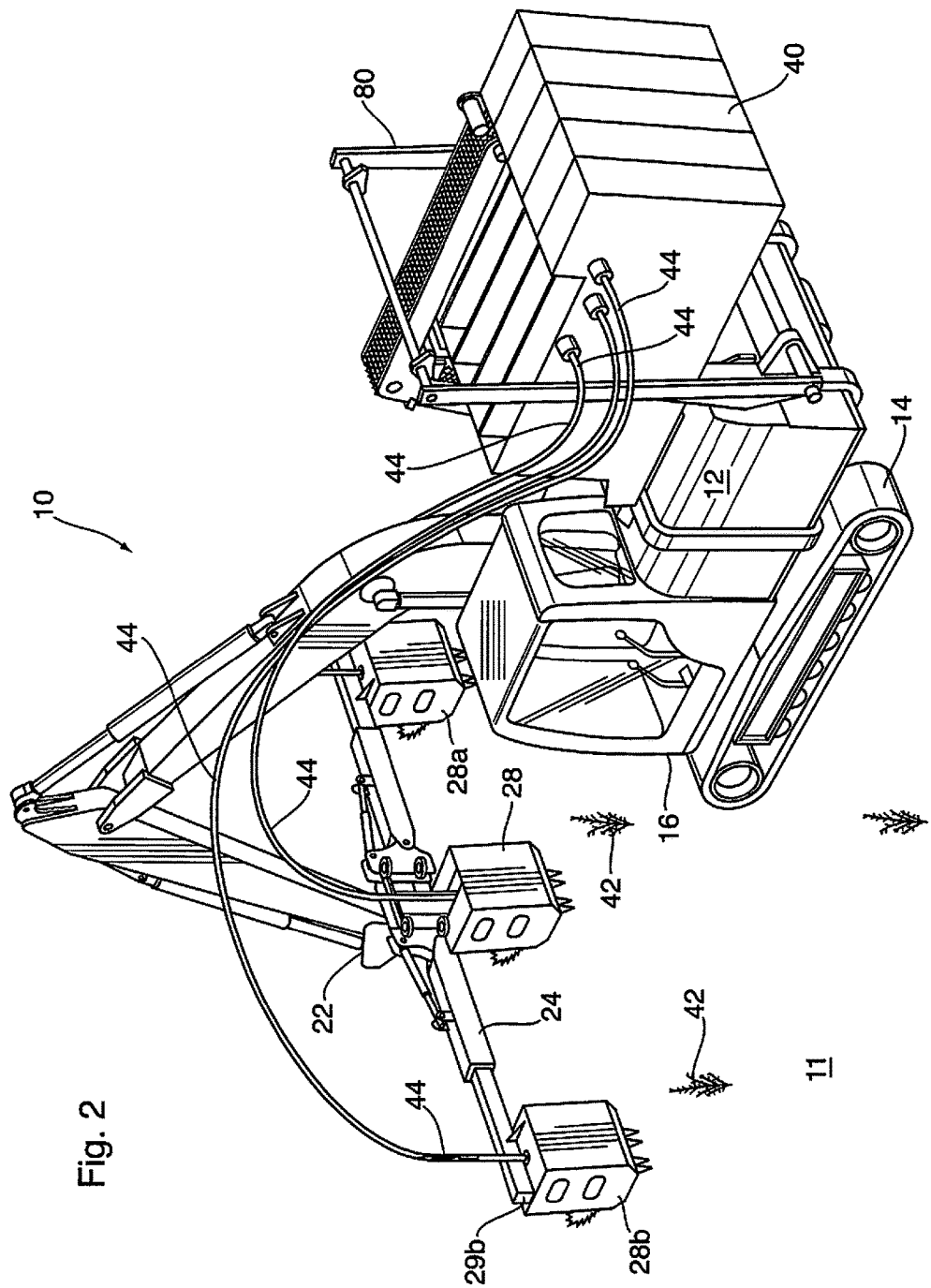
FIG. 2 is a rear perspective view of the automated seedling planter shown in FIG. 1, depicting further depicting the gantry system for loading and demounting the bin containing seedlings.
Figure 3:
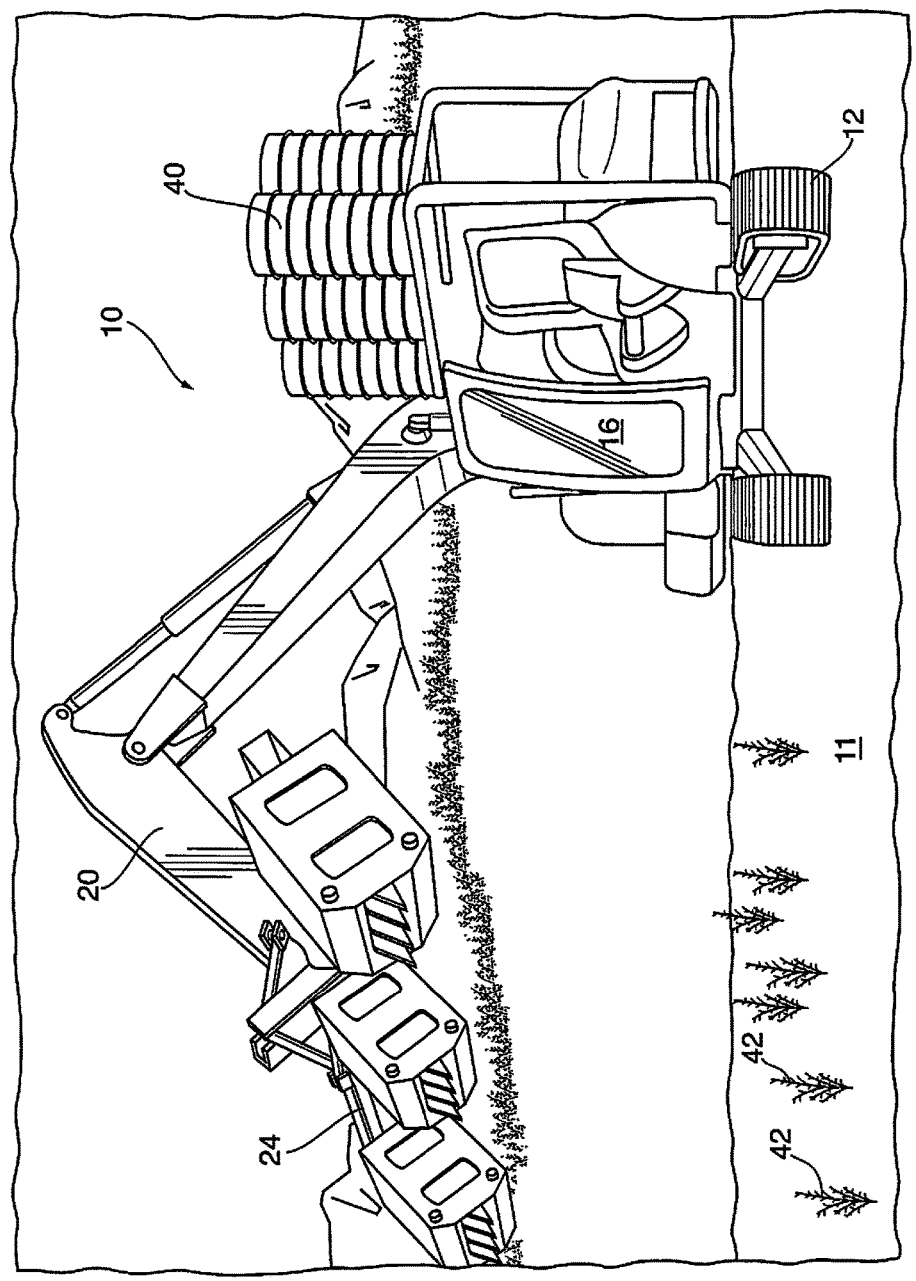
FIG. 3 is a front view of the automated seedling planter of the present invention, wherein the moveable arm is swung to the side of the seedling planter so that the boom member is aligned at a transverse angle to the direction of travel of the automated planter, to thereby plant seedlings with a foreshortened distance of separation between them if the position of the seedling injectors on the boom member is fixed on such boom member.

FIGS. 1-4 depict an automated seedling planter 10 of the present invention for planting seedlings 42 in ground 11. FIG. 1 depicts a forward perspective view (FIG. 1) the automated seedling planter 10; FIG. 2 a rear perspective view; FIG. 3 a frontal perspective view when a side method of planting seedlings is employed (typically when seedling spacing is such that tracks 14 of the vehicle 12 would otherwise overrun the planted seedlings 42 if a frontal planting position of moveable are 20 was employed), and FIG. 4 being a rear perspective view of a further embodiment of automated seedling planter 10 which employs a boom-rotating means 70 to rotate the boom 24 in a plane parallel to ground 11.

As may be generally seen from FIGS. 1-4, automated seedling planter 10 comprises a powered vehicle 12 having tracks 14 for traversing difficult terrain or loose or muddy ground 11. Powered vehicle 12 typically comprises a modified earth excavator having an excavator bucket (not shown) removed from a distal end 22 of a powered articulated moveable arm 20, and a boom member 24 coupled to moveable arm 20 at distal end 22 thereof. Moveable arm 20 on tracked vehicle 12 is preferably capable of being swung from side to side of vehicle 12 by the operator as is common for earth excavators. Proximal end 23 of moveable arm 20 is pivotably secured to vehicle 12.

Advantageously, in place of the excavator bucket (not shown) there is provided an elongate boom member 24 mounted at the distal end 22 of moveable articulated arm 20. Elongate boom member 24 extends horizontally and perpendicularly outwardly from distal end 22 of moveable arm 20.

A plurality of seedling injectors 28 are mounted in spaced relation to each other along a length of elongate boom member 24. Seedling injectors 28 inject seedlings 42 into ground 11 during travel of automated seedling planter 10 in a forward direction as shown in FIG. 1. Boom member 24 possesses at least a pair (28a, 28b) of seeding injectors 28 mounted on mutually opposite ends (29a, 29b) respectively of boom member 24. (see FIG. 5)

Figure 5:
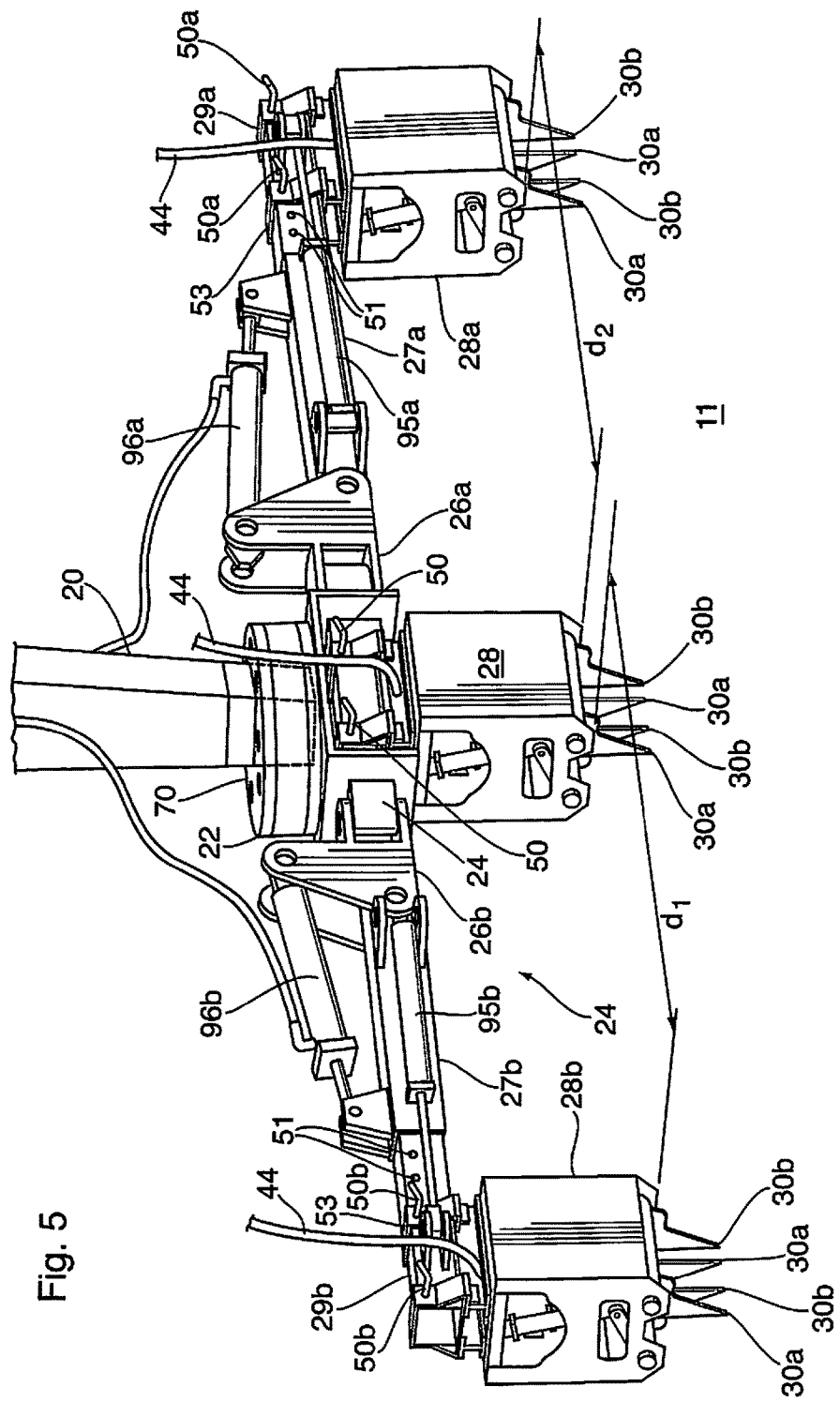
FIG. 5 in an enlarged view of an embodiment of the boom member of the automated seedling planter of the present invention, such boom member having the features of extendable mutually opposite ends (wrist elements) and thus the ability to reposition the seedling injectors on such mutually opposite ends, and further having additional hydraulic cylinders to allow, when desired, pivotable folding of one or both of the wrist elements for the purpose of obstacle avoidance and/or transportation of the automated seedling planter, such as by flatbed trailer, when not being used.
Figure 9:
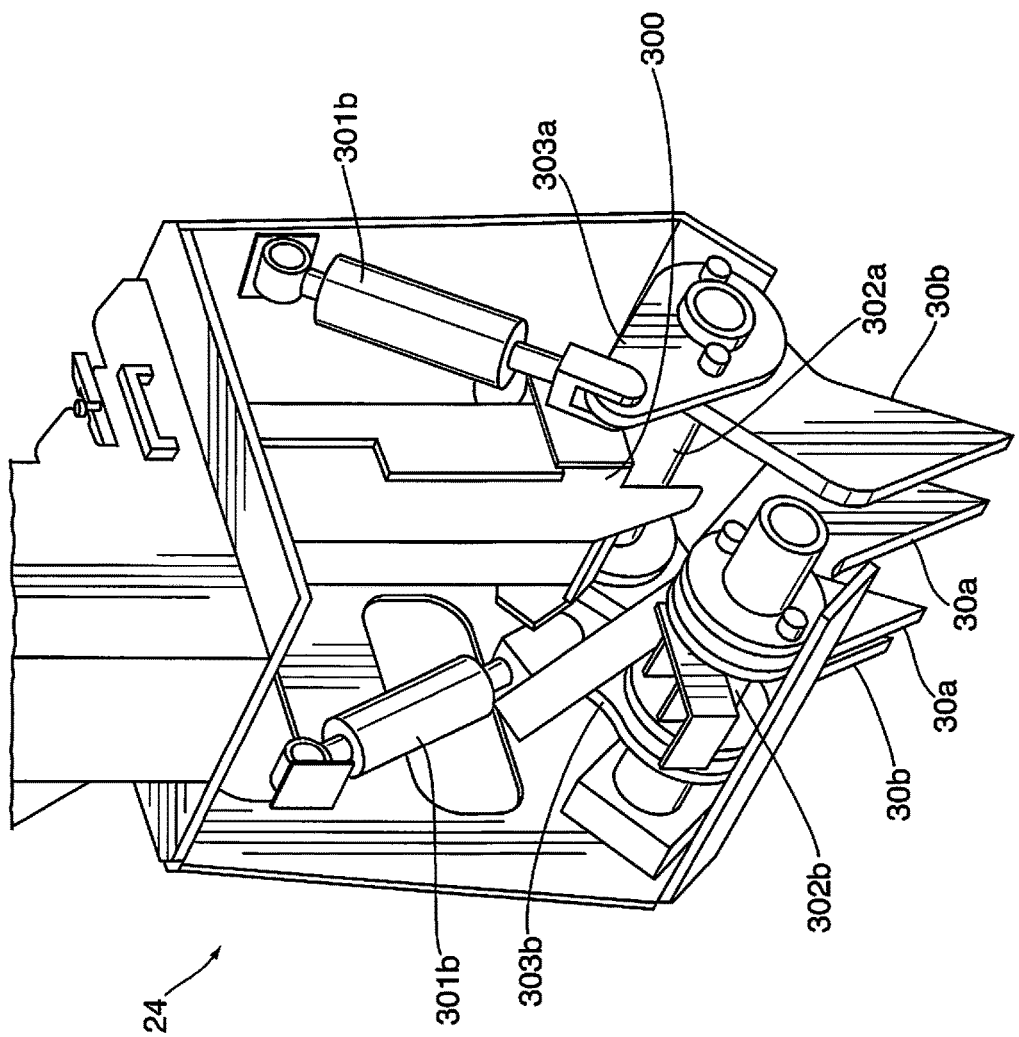
FIG. 9 is a cut-away view of one embodiment of the seedling injector for use in the automated seedling planter of the present invention.
Figure 12:
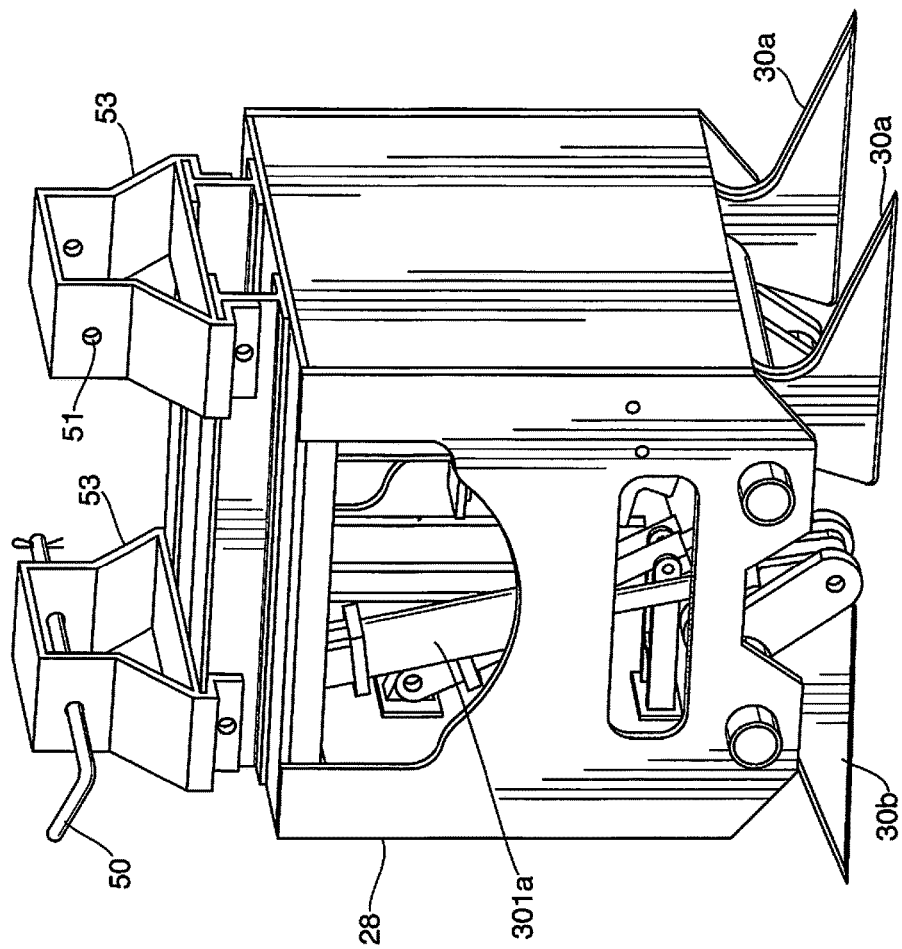
FIG. 12 is a partial cut-away view of the seedling injector of FIG. 9, further showing one embodiment of the manner, using loop brackets, by which the seedling injectors may be slidably mounted or removed from the boom member.

As may be best seen from FIGS. 5, 9, & 12 seedling injectors 28 each comprise soil-engaging and/or soil tillage members 30a, 30b protruding from a ventral position. Soil tillage members 30a, 30b are configured so as to reciprocate in a back and forth manner as more fully explained herein at the time or immediately prior to injection of a seedling 42 in ground 11 by a respective seedling injector 28, so allow tillage of earth around the seedling 42 or breaking up of ground 11 in preparation for seedling injection in ground 11. Such feature is particularly useful if planting is being done in winter and the ground otherwise be frozen, or if the ground 11 is otherwise hard or compacted, and also for tillage of unwanted plant material at the location of seedling planting.

A seedling bin 40 for containing seedlings 42 on vehicle 12 prior to their being planted by seedling planter 10, may be mounted on seedling planter 10, preferably at the rear of vehicle 12, as shown in FIGS. 1-4.

To allow seedlings 42 in bin 40 to be rapidly and efficiently supplied to each seedling injector 28 for planting, the seedling planter 10 of the present invention utilizes a plurality of flexible hoses 44 extending from bin 40 respectively to each of seedling injectors 28. In a preferred embodiment, flexible hoses 44 are vacuum hoses. In such embodiment, the supply of seedlings 42 to each of said seedling injectors 28 is achieved by said seedling injectors 28 withdrawing air from an associated respective vacuum hose 44 extending from such respective seedling injector 28 to bin 40, to thereby withdraw seedlings 42 through such vacuum hose 44 to a respective seedling injector 28 for injection into ground 11.

In a preferred embodiment as best shown in FIG. 5, boom member 24 is provided with powered means 95*a*, 95*b* for extending and retracting one or both of mutually opposite ends 29*a*, 29*b* of boom member 24, so as to thereby alter distance 'd$_1$' and/or 'd$_2$' separating a pair 28*a*, 28*b* of seedling injectors 28*a*, 28*b* which are respectively situated at mutually opposite ends 29*a*, 29*b* of boom member 24. Powered means 95*a*, 95*b* may comprise any motive force, such as a piston and cylinder powered by hydraulic fluid or compressed air, or an electric or pneumatically-powered motor. In a preferred embodiment powered means comprises hydraulic cylinders 95*a*, 95*b* as shown in FIG. 5.

Figure 6:
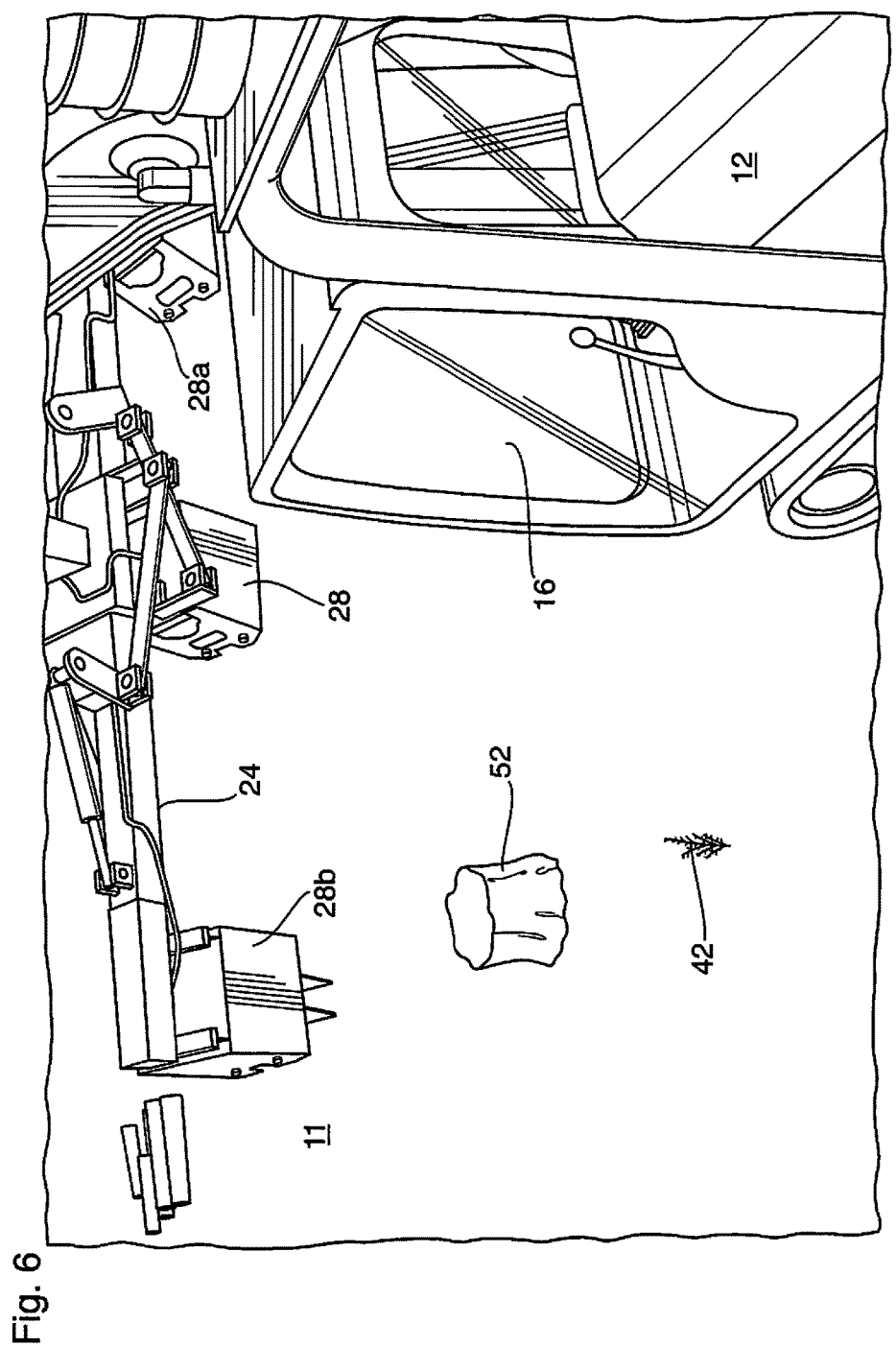
FIG. 6 is a forward-looking view from the cab of the automated seedling planter of the present invention, when the boom member thereof initially encounters an obstacle which otherwise obstructs the planting by one of the seedling injectors on such boom member.
Figure 7:
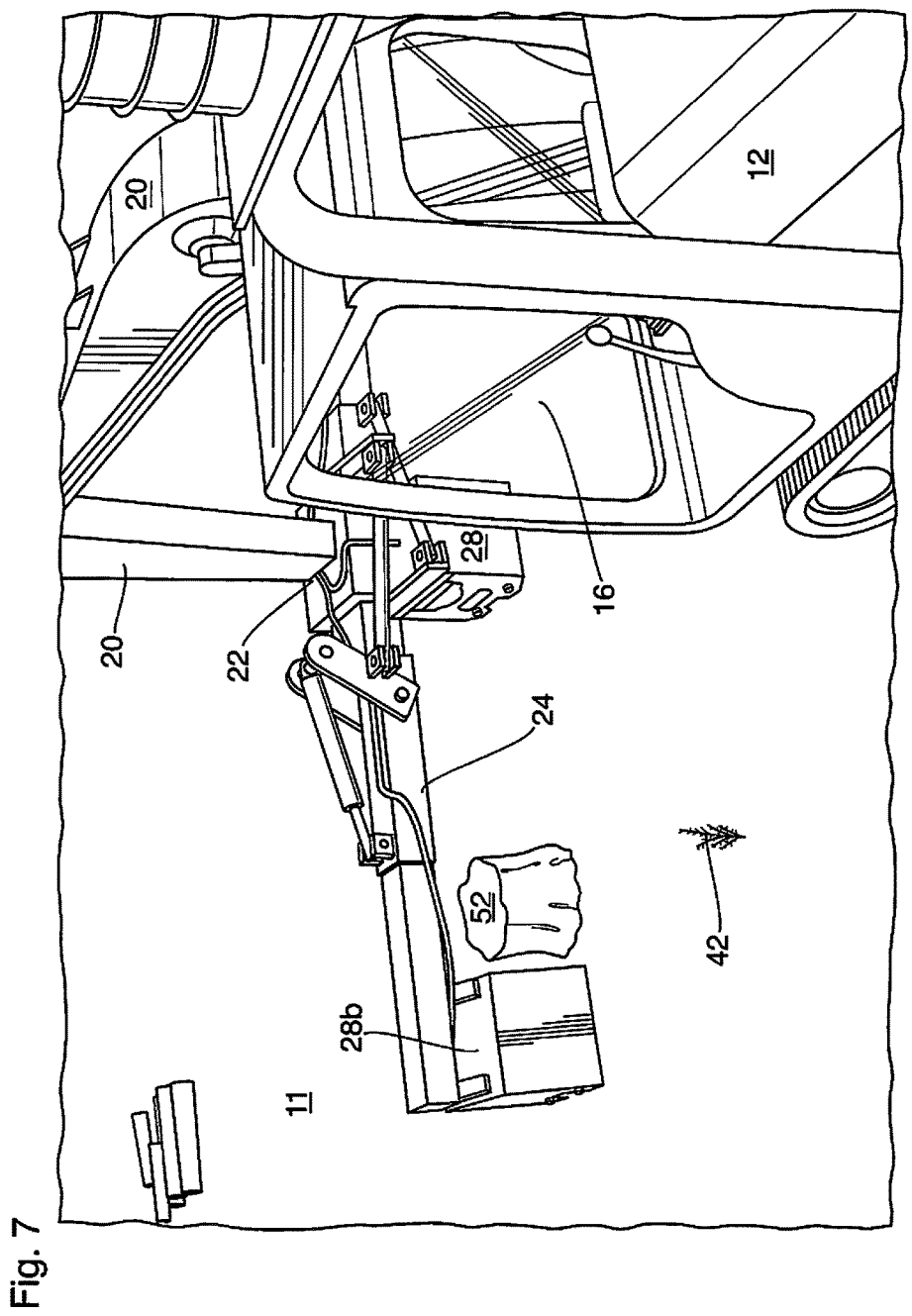
FIG. 7 is a similar forward-looking view from the cab of the automated seedling planter of the present invention, with one of the hydraulic cylinders on the boom member having been actuated by the operator so as to extend the boom member at one end so as to thereby reposition one of the seedling injectors and avoid the obstacle (tree stump) and thereby allow planting.

Advantageously and by way of illustrative example, as best shown in successive FIGS. 6 & 7, should seedling planter 10 approach an obstacle such as a tree stump 52 at a location which would otherwise interfere with seedling injector 28*b* planting a seedling 42 at such location (ref. FIG. 6), hydraulic cylinder 95*b* may be actuated to extend end 29*b* telescopically outwardly from pivotable wrist member 27*b* of boom member 24, to thereby avoid tree stump 52 when boom member 24 is lowered so as to contact ground 11 and allow seedling injector 28*b* to then inject a seedling at a location other than at the location of stump 52.

In a refinement, powered means 95*a*, 95*b* may be provided for each seedling injector 28 situated along boom member 24 to further provide capability of individually adjusting distances separating not only h the pair of seedling injectors 28*a*, 28*b* mounted on mutually opposite ends 29*a*, 29*b* of boom member 24 but all individual seedling injectors 28 along boom member 24. Such feature is useful and advantageous for not only avoiding obstacles, such as tree stumps in the example depicted in FIGS. 6 & 7 for each seedling injector 28, but is also advantageous for adjusting simultaneously the spacing distances 'd' separating each seedling injector 28 from another. In such manner spacing distance "d$_1$", "d$_2$" etc. may be varied by the seedling planter operator when using seedling planter 10 at different seedling locations and with different types of seedlings 42, without having the operator of the seedling planter 10 be forced to exit from cab 16 to manually relocate spacing of seedling injectors 28 along boom member 24 in the manner below explained.

If no powered means 95*a*, 95*b* is provided for automated re-positioning of seedling injectors 28 along boom member 24, in an alternative embodiment seedling injectors 28 may nonetheless be manually repositioned along boom member 24 via a position-adjustment mechanism 50*a*, 50*b* to allow spacing distances 'd' separating each seedling injector 28 from another to nevertheless still be adjusted. Advantageously, this feature allows adjustment of spacing between seedlings, for different seedling locations and with different types of seedlings 42.

In such embodiment, as best showing in FIG. 5 & FIG. 12, each of seedling injectors 28 are slidably mounted on boom member 24 via (and position-adjustment mechanism 50*a*, 50*b* comprises) a pair of inverted cup-shaped brackets 53, each bracket member having an aperture 51 therein for receiving a locking pin 50. Boom member 24 is likewise provided with a plurality of apertures 51 therealong for receiving locking pin 50. Repositioning of a seedling injector 28 along boom member 24 is accomplished by removing locking pin 50, slidably repositioning seedling injectors 24 along boom member 24 to a desired position having a uniform desired separation between seedling injectors 28, and reinserting locking pin 50 when each seedling injector 28 is at a location when aperture 51 in inverted cup-shaped bracket 53 is aligned with corresponding aperture 51 in boom member 24 at the desired spacing distance. As shown in FIG. 5, such manual means of repositioning seedling injectors 28 along boom member 24 may be used in combination with powered means 95*a*, 95*b*.

Figure 8:
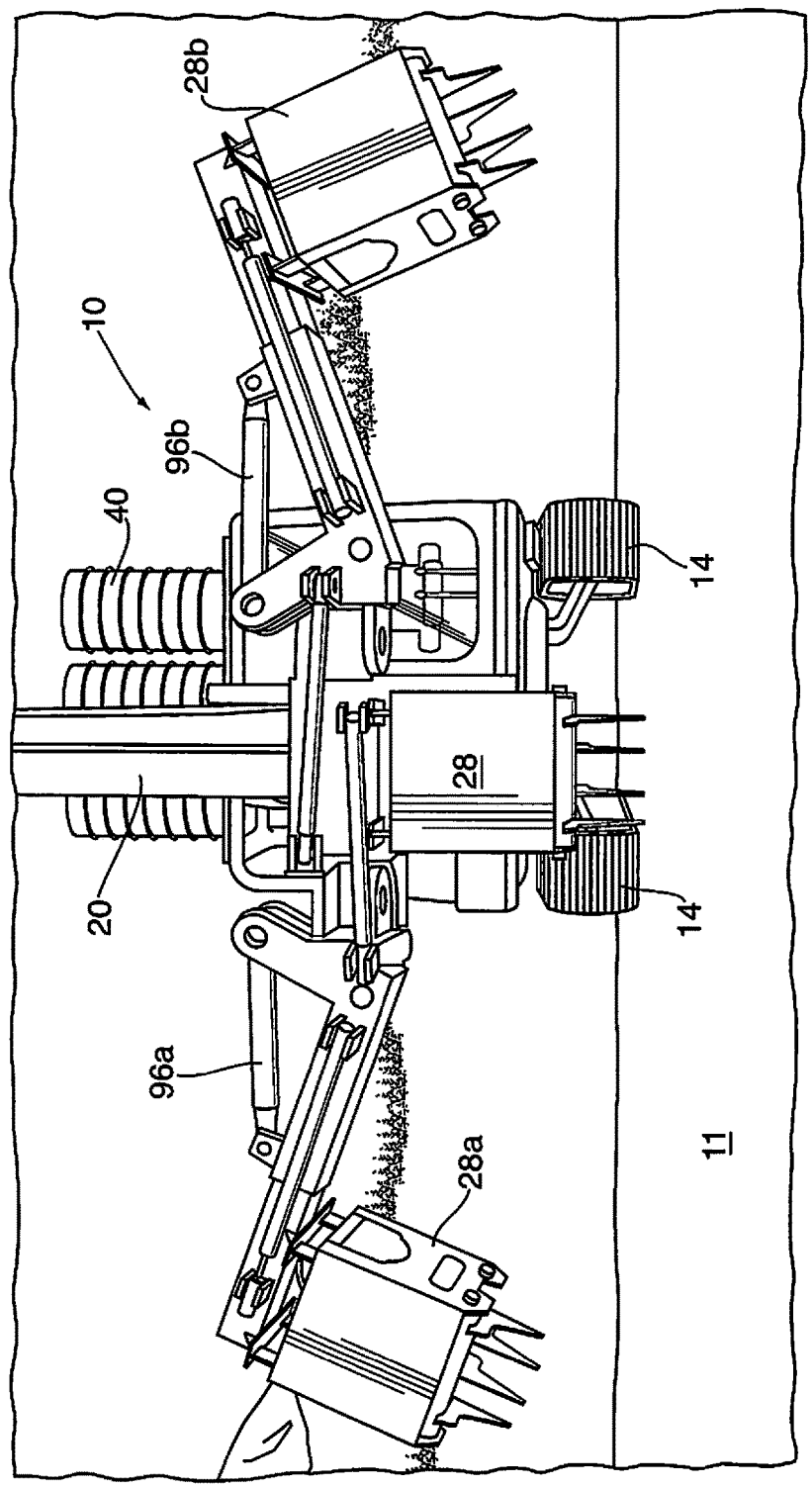
FIG. 8 is a frontal view of the automated seedling planter of the present invention, wherein the ends of the boom member (wrist elements) have been partially pivotably folded, to reduce the length of the boom member, to avoid obstacles and/or when about to be transported on, for example, the flatbed of a tractor trailer truck.

In a further refinement of seedling planter 10, and as best shown in FIG. 8 and FIG. 5, further capability of the boom member 24 of pivotable folding of boom member 24 on each of respective opposite sides of moveable arm 20 is provided. In such further refinement boom member 24 is comprised of two half-members 25*a*, 25*b* extending respectively perpendicularly outwardly of respective mutually opposite sides of distal end 22 of moveable arm 20. Each of half-members 26*a*, 26*b* are provided with a respective pivotable wrist members 27*a*, 27*b* pivotably mounted at and to a respective outboard end 29*a*, 29*b* of each of half-members 26*a*, 26*b*.

Pivotable wrist members 27*a*, 27*b* are each respectively coupled to a respective hydraulic cylinder 96*a*, 96*b* to thereby allow powered pivotable folding of each wrist member 27*a*, 27*b* on a respective half-member 26*a*, 26*b* as shown in FIG. 8 when the respective hydraulic cylinder 96*a*, 96*b* is actuated by seedling planter operator.

Such above further refinement advantageously provides two important features.

Firstly such further refinement allows one or more seedling injectors 28, and particularly seedling injectors 28*a*, 28*b* mounted at mutually opposite ends of boom member 24, to be raised to avoid an obstacle such as a tree stump 52 in the path of boom member 24 (Of course, such obstacle 52 may be alternatively be avoided by raising movable arm 20, or by extending or retracting the seedling injector 28*b* in the manner explained and as shown in FIGS. 6 & 7).

Secondly, and more importantly, such refinement allows the width of the boom member 24 to be temporarily reduced. This feature in particularly thereby allows for the transportation of the seedling planter 10 along roadways of limited width, and during transportation of seedling planter 10 from one planting location to another, or to allow the planter 10 to pass between two obstacles, such as two spaced apart trees.

Figure 4:
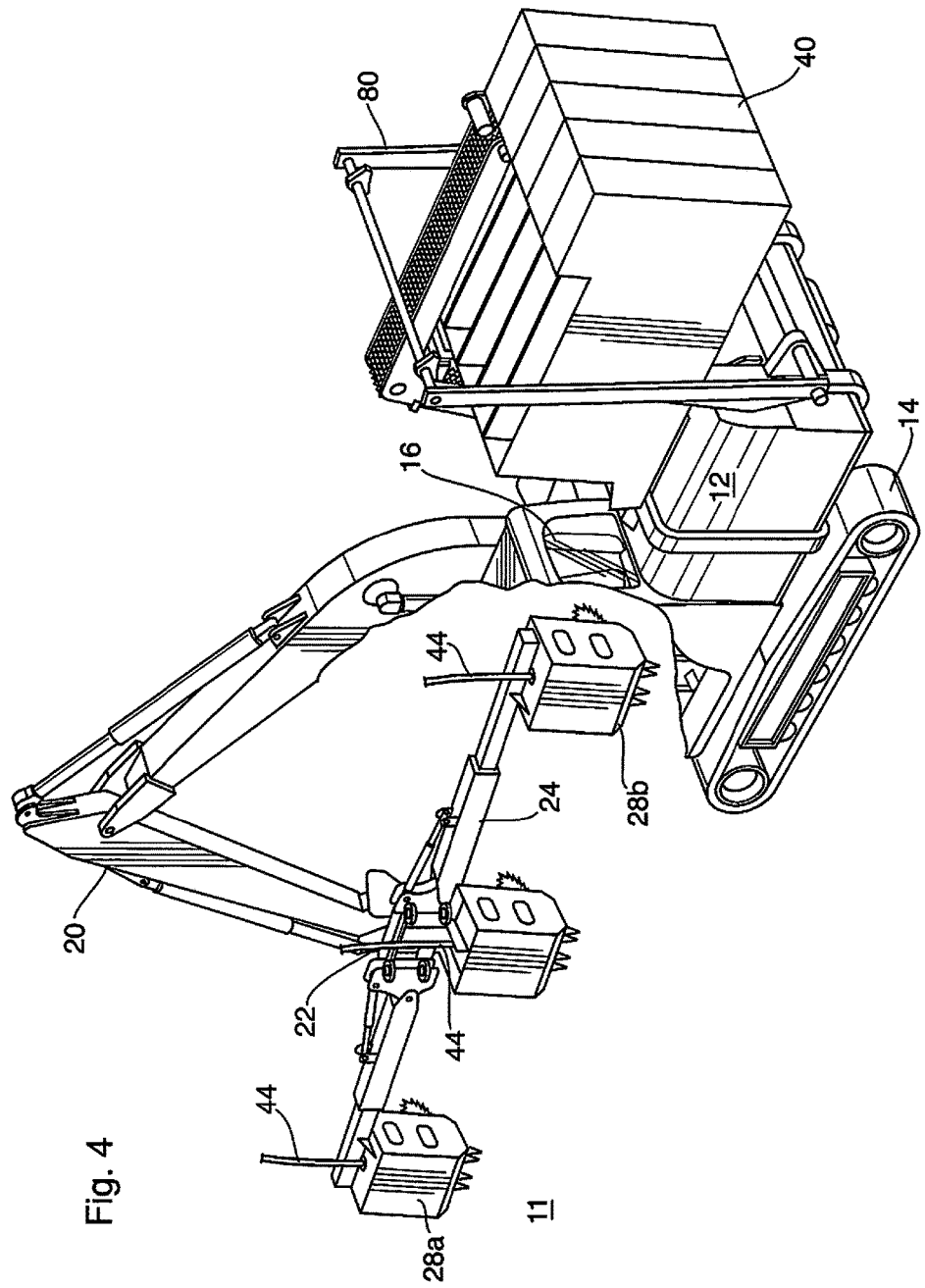
FIG. 4 is a rear perspective view of an embodiment of the automated seedling planter of the present invention, having the feature wherein the boom member may be pivoted about the distal end of the movable arm, so as to allow planting of seedlings with a foreshortened distance of separation between them if the position of the seedling injectors on the boom member is fixed on such boom member.

In a still further refinement, boom member 24 may be rotatable about an azimuth in a plane parallel to ground 11, as best shown for example comparing FIGS. 1 & 4, where boom member 24 has been rotated in such a plane from its orientation in FIG. 1 to that shown in FIG. 4. In such further refinement boom rotating means 70 is provided at distal end 22 of moveable arm 20.

Boom rotating means 70 may comprise a roller bearing (not shown), an electric or hydraulically powered motor 71 powering a driving pinion (not shown), and a gear ring (not shown) fixedly secured to one or the other of the distal end 22 of moveable arm 20 or boom member 24, with the driving pinion causing relative rotation of boom member 24 relative and about distal end 22 of moveable arm 20.

Other configurations of boom-rotating means 70 and means for providing relative rotatable motion of boom member 24 to distal end 22 of movable arm 20 will now occur to persons of skill in the art of hydraulic equipment, and are not further described herein. The feature of a rotatable boom member 24 may alternatively allow the width of the planter 10 to be reduced, instead of using hydraulic cylinders 96a, 96b to foldable collapse boom member 24.

In addition, by having a rotatable boom 24, such allows, when moveable arm 20 is moved to the side of planter 10 as shown in FIG. 3 for side planting, boom 24 to be rotated so as to continue to be perpendicular to the direction of travel of the planter 10.

Figure 11:
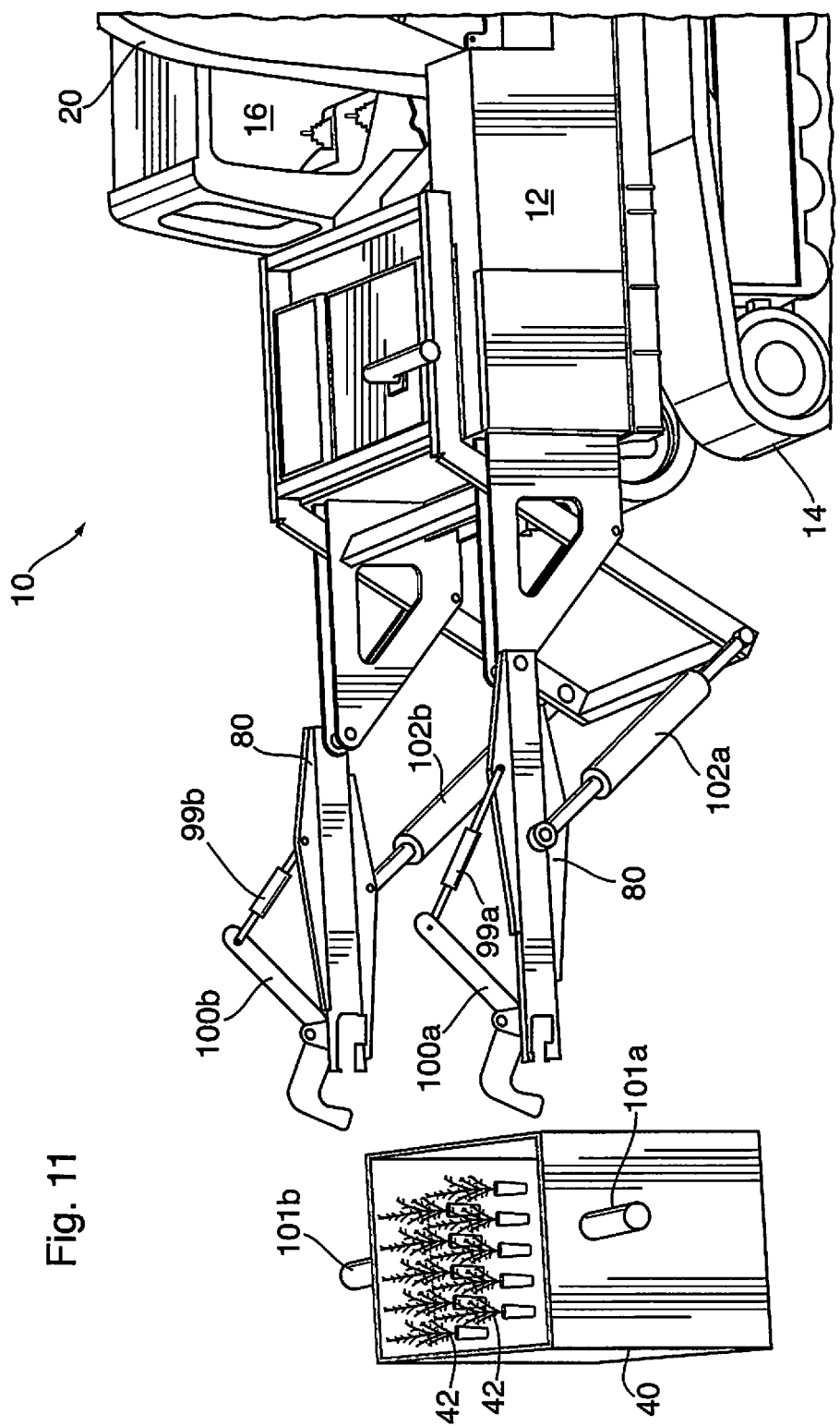
FIG. 11 is a partial perspective view of an alternative gantry mounting system, for mounting and demounting a bin containing seedlings onto and from the rear of the automated seedling planter.

In preferred embodiments of the seedling planter 10, a powered gantry 80 may be provided for lifting bin 40 onto rear of seeding planter 10, and for demounting bin 40 from planter 10 when supply of seedlings 42 therein is exhausted, as best shown in FIGS. 2, 19, & 11, Preferably, powered gantry 80 possesses bin-engaging apparatus 90, such as a pair of hydraulically powered cylinders 99a, 99b driving corresponding lever arms 100a, 100b, for releasably engaging pinions 101a, 101b on bin 40 to allow powered gantry 80 to engageably couple to bin 40, and then via cylinders 102a, 102b lift bin 40 to rear of planter 10. The aforesaid equipment operates in reverse to demount bin 40 from rear of planter 10.

Figure 10:
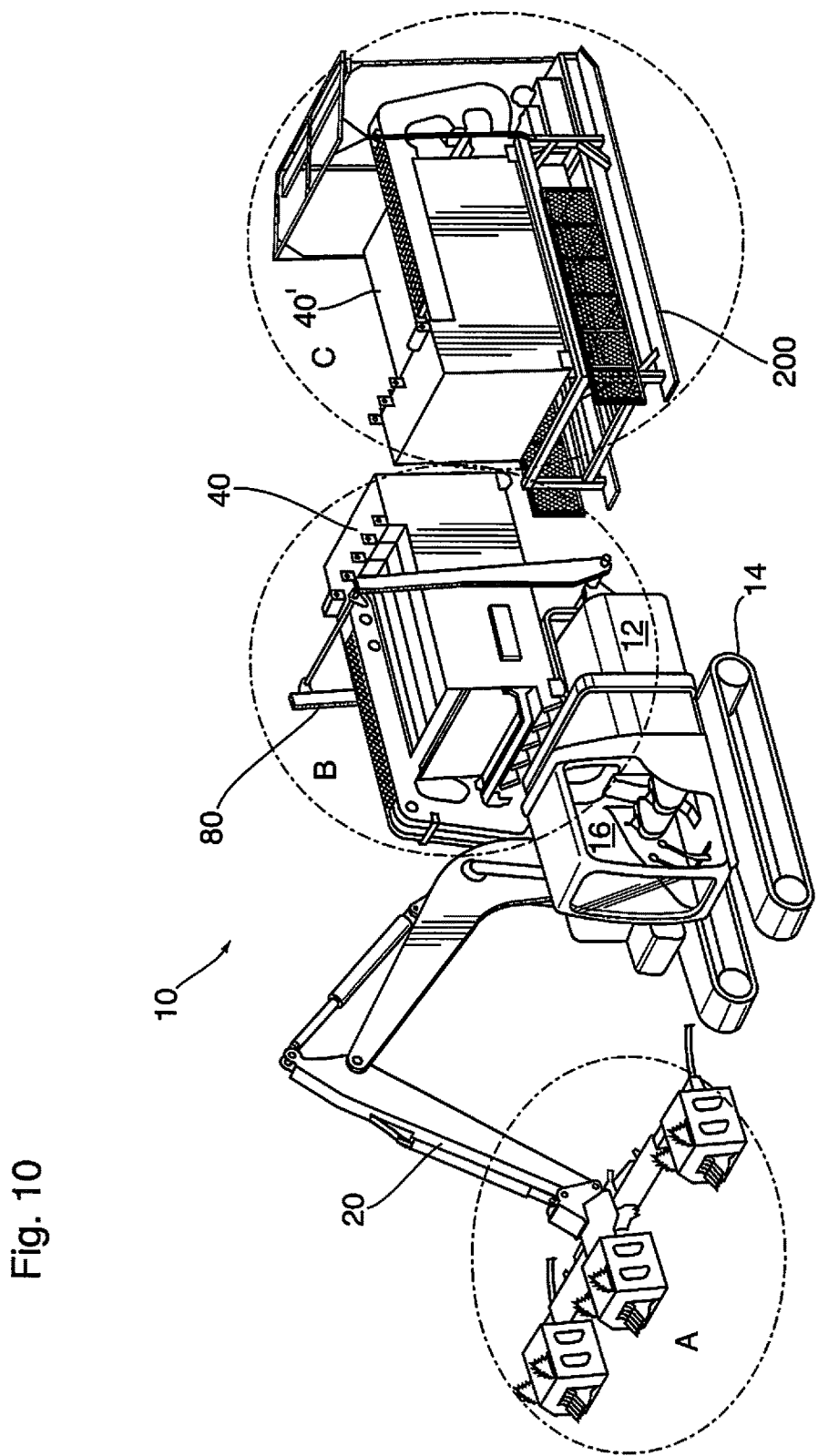
FIG. 10 is a perspective view of the automated seedling planter of the present invention, having as an optional accessory a skid which may have a bin of seedlings loaded thereon, and which may be towed by the automated seedling planter of the present invention.

In a further refinement, a towable skid 200 on which an additional bin 40' may be carried at shown in FIG. 10, may be towed by planter 10 to increase the range that planter 10 may plant with seedling 42, without having to return to a base for restocking of bin 40.

FIGS. 9 & 12 show partial cut-away sections of a typical seedling injector 28, and in particular the reciprocating soil tillage members 30a, 30b which protrude from a ventral portion of each seedling injector 28, preferably on either side of where seedlings 42 are supplied to seedling ground penetrating portion 300 of seedling injector 28. Powered means, such as, but not limited to, a pair of double-acting hydraulic piston/cylinders 301a, 301b, are respectively, through cam arms 303a, 303b, coupled to respective rotatable shafts 302a, 302b to convert linear motion of the hydraulic cylinders 301a, 301b to rotary motion, thereby moving respective tillage members 30a, 30b mounted thereon in a back and forth motion when pistons in hydraulic cylinders 301a, 301b are actuated back and forth. Soil around and at the location of injection of seedling 42 may thereby be broken up and tilled. Such advantageously allows for not only breaking up of ground 11 for example when planting of seedlings in winter when ground 11 may be frozen, but further allows for tillage and elimination of weeds and aeration of the soil in the region of seedling planting to thereby assist growth of the planted seedling 42.

Clearly, various configurations and mechanisms for reciprocating tillage members 30a, 30b on seedling injectors 28 will now occur to persons of skill in the art. For example, in place of linearly-oscillating hydraulic cylinders 301a, 301b, rotatable shafts 302a, 302b, may alternatively be oscillated back and forth via a corresponding pair of electrically-powered or pneumatically-powered motors (not shown) to thereby oscillate tillage members 30a,30b mounted thereon.

Operation of Seedling Planter and Planting Operation

The manner of operation of seedling planter 10 is briefly described below.

Seedling planter 10 is first transported to a location for planting. A bin 40, loaded with seedlings 42, is independently transported to site, or may be transported to site with seedling planter 10.

Seedling planter is positioned so that powered gantry 80, and in particular the pair of hydraulically powered cylinders 99a, 99b driving corresponding lever arms 100a, 100b, are positioned so as to allow them to releasably engage pinions 101a, 101b on bin 40. Hydraulic pistons/cylinders 102a, 102b are then actuated to then lift and mount bin 40 on seedling planter 10.

Vacuum hoses 44 are then coupled to bin 40, to allow supply of seedlings 42 to individual seedling injectors 28.

Hydraulic arms 96a, 96b are actuated, to unfold boom member 24 from a typically-folded position for transport as partially shown in FIG. 8, to the unfolded operative position as shown in FIG. 1.

Spacing between seedling injectors 28 is then adjusted to a desired uniform distance for the location and seedlings 42 being planted at such site, either manually via position-locator means 50a, 50b as described above, or via powered means 95a, 95b as earlier described.

Thereafter, moveable arm 20 is positioned directly in front of vehicle 12, or moveable arm 20 swung to one side of planter 10 as shown in FIG. 3. Vehicle 12 is then moved in a forward direction.

Planting is commenced by stopping forward motion of seedling planter 10, lowering boom member 24 such that seedling injectors 28 thereon engage the ground at regular intervals, actuating tillage member 30a, 30b so as to till the ground in the region of the seedling 42 being planted at each seedling injector 28. Each seedling injector 28 thereafter applies a vacuum to each vacuum hose 44 to withdraw a respective seedling 42 from bin 40 through such vacuum hose 44 to the respective seedling injector 28, and such seedling 42 injected into the tilled ground 11 via ground-penetrating portion 300 of seedling injector 28.

Moveable arm 20 and boom member 24 are then raised, forward motion of the seedling planter 10 is resumed, and the above seedling planting step is carried out at the next planting location.

The above process is repeated until a plot of land is fully planted with seedlings 42 or until bin 40 requires re-filling, in which case the emptied bin 40 is demounted from planter 10, and a restocked bin 40 then mounted on seedling planter 10 via the powered gantry 80 and the seedling planting operation resumed.

The foregoing description of some embodiments of the system of the present invention is provided to enable any person skilled in the art to make and use the present invention.

For a complete definition of the invention and its intended scope, reference is to be made to the summary of the invention and the appended claims, read together with and considered with the above disclosure and drawings herein.

The invention claimed is:

1. A seedling planter (10) for planting seedlings (42) in ground (11), comprising:
   a powered vehicle (12) configured to traverse said ground (11), having a cab (16) thereon for an operator;
   an elongate, powered, articulated moveable arm (20), a proximal end of which is pivotably secured to said powered vehicle (12) and a distal end (22) of which is extendable outwardly from said powered vehicle (12);
   an elongate boom member (24), mounted at said distal end (22) of said moveable arm (20), at least portions of which are disposed parallel to said ground;
   a plurality of seedling injectors (28) for planting seedlings in said ground (11), mounted in spaced relation along a length of said elongate boom member (24), said plurality of seedling injectors (28) comprising at least a pair (28a, 28b) of seedling injectors (28) mounted on mutually opposite ends (29a, 29b) of said elongate boom member (24);

said plurality of seedling injectors (28) each comprising soil-engaging members (30a, 30b) for at least one of piercing and tilling the ground (11) when injecting said seedlings in said ground;
a bin (40), configured to contain said seedlings (42); and
a plurality of flexible hoses (44) extending from said bin (40) to respectively each of said plurality of seedling injectors (28), for successively supplying individual of said seedlings (42) from said bin (40) to each of said plurality of seedling injectors (28) for planting in said ground (11).

2. The seedling planter for planting seedlings in said ground as claimed in claim 1, wherein ends of said elongate boom member (24) are longitudinally extendable and retractable.

3. The seedling planter for planting seedlings in said ground as claimed in claim 1, further having powered means for extending and retracting mutually-opposite ends of said elongate boom member (24) so as to thereby alter a distance separating said pair of seedling injectors which are respectively situated at said mutually opposite ends of said elongate boom member (24).

4. The seedling planter for planting seedlings in said ground as claimed in claim 1, said elongate boom member (24) further having powered means thereon for altering a distance separating two or more seedling injectors on said elongate boom member (24) from each other, and wherein said powered means may be actuated and controlled by said operator from said cab.

5. The seedling planter for planting seedlings in said ground as claimed in claim 1, further having powered means situated on said elongate boom member (24) for altering a distance separating one seedling injector (28a) from another (28b) of said plurality of seedling injectors (28a, 28b) on said elongate boom member (24).

6. The seedling planter for planting seedlings in said ground as claimed in claim 1, each seedling injector (28) mounted on said elongate boom member (24) further having a position adjustment mechanism (50a, 50b) to allow altering or varying relative spacing of said plurality of seedling injectors (28) along said elongate boom member (24).

7. The seedling planter for planting seedlings in said ground as claimed in claim 1, wherein said elongate boom member (24) is comprised of two half-members (25a, 25b) extending perpendicularly outwardly of respective mutually opposite sides (26a, 26b) of said distal end (22) of said moveable arm (20), each of said half-members (26a, 26b) having a pivotable wrist member (27a, 27b) pivotably mounted at an outboard end (29a, 29b) of each of said half-members (26a, 26b), said pivotable wrist members (27a, 27b) each respectively coupled to a respective hydraulic cylinder (96a, 96b) to allow powered pivotable folding of each wrist member (27a, 27b) on a respective half-member (26a, 26b) when the respective hydraulic cylinder (96a, 96b) is actuated by said operator.

8. The seedling planter for planting seedlings in ground as claimed in claim 1, further comprising boom-rotating means (70) at said distal end (22) of said moveable arm (20) for rotating said elongate boom member (24) about said distal end (22) of said movable arm (20) and within a plane parallel to said ground (11).

9. The seedling planter for planting seedlings in ground as claimed in claim 8, wherein said boom-rotating means (70) is powered to allow said operator to rotate said elongate boom member (24) about an azimuth in said plane parallel to said ground and remotely from said cab.

10. The seedling planter for planting seedlings in ground as claimed in claim 1, further comprising a powered gantry (80) for lifting said bin (40) onto said powered vehicle (12), and for demounting said bin (40) from said powered vehicle (12) when supply of seedlings (42) therein is exhausted.

11. The seedling planter for planting seedlings in said ground as claimed in claim 10, wherein said powered gantry (80) further possesses bin-engaging apparatus (90) for releasably engaging said bin (40) to allow said powered gantry (80) to lift said bin (40) onto said powered vehicle (12) and to demount said bin (40) from said powered vehicle (12).

12. The seedling planter for planting seedlings in ground as claimed in claim 1, wherein said moveable arm (20) may further be pivoted from side to side of the powered vehicle (12) when desired by said operator.

13. The seedling planter for planting seedlings in said ground as claimed in claim 1, wherein said flexible hoses are vacuum hoses and said supply of seedlings (42) to each of said plurality of seedling injectors (28) is achieved by said plurality of seedling injectors withdrawing air from an associated of said hoses extending to said bin.

14. The seedling planter for planting seedlings in said ground as claimed in claim 1, each of said plurality of seedling injectors further comprising soil tillage means (30a, 30b) protruding from a ventral position thereof, such soil tillage means (30a, 30b) adapted to be reciprocated in a back and forth manner at a time of injection of a seedling in said ground by a respective seedling injector.

* * * * *